United States Patent [19]

Devitt

[11] 4,302,264
[45] Nov. 24, 1981

[54] METHOD FOR PRETREATING GLASS CORDS WHICH MINIMIZES CORD BLOWS

[75] Inventor: James J. Devitt, Suffield, Ohio

[73] Assignee: The General Tire & Rubber Company, Akron, Ohio

[21] Appl. No.: 150,111

[22] Filed: May 15, 1980

Related U.S. Application Data

[63] Continuation of Ser. No. 795,258, May 9, 1977, abandoned, which is a continuation of Ser. No. 366,902, Jun. 4, 1973, abandoned.

[51] Int. Cl.³ .................... B29H 17/28; B29H 9/02
[52] U.S. Cl. ............................ 156/110 A; 427/302
[58] Field of Search ................ 427/302; 156/110 A

[56] References Cited

U.S. PATENT DOCUMENTS 3,705,052 12/1972 Marzocchi ............... 427/302 X
3,764,452 10/1973 Marzocchi ............... 427/302 X

*Primary Examiner*—James R. Hoffman

[57] ABSTRACT

An improvement in the method of preparing a glass-reinforced elastomeric product whereby cord blows may be eliminated. The method includes treating the glass fabric with a dip which improves adhesion to the rubber, and calendering the glass fabric and the rubber compound. The improvement comprises the step, prior to the calendering, of applying to the glass fabric an overdip composition including an effective amount of a material which is a cure accelerator for the rubber, whereby the amount of time required for full cure, and compaction of the rubber compound is reduced.

1 Claim, 1 Drawing Figure

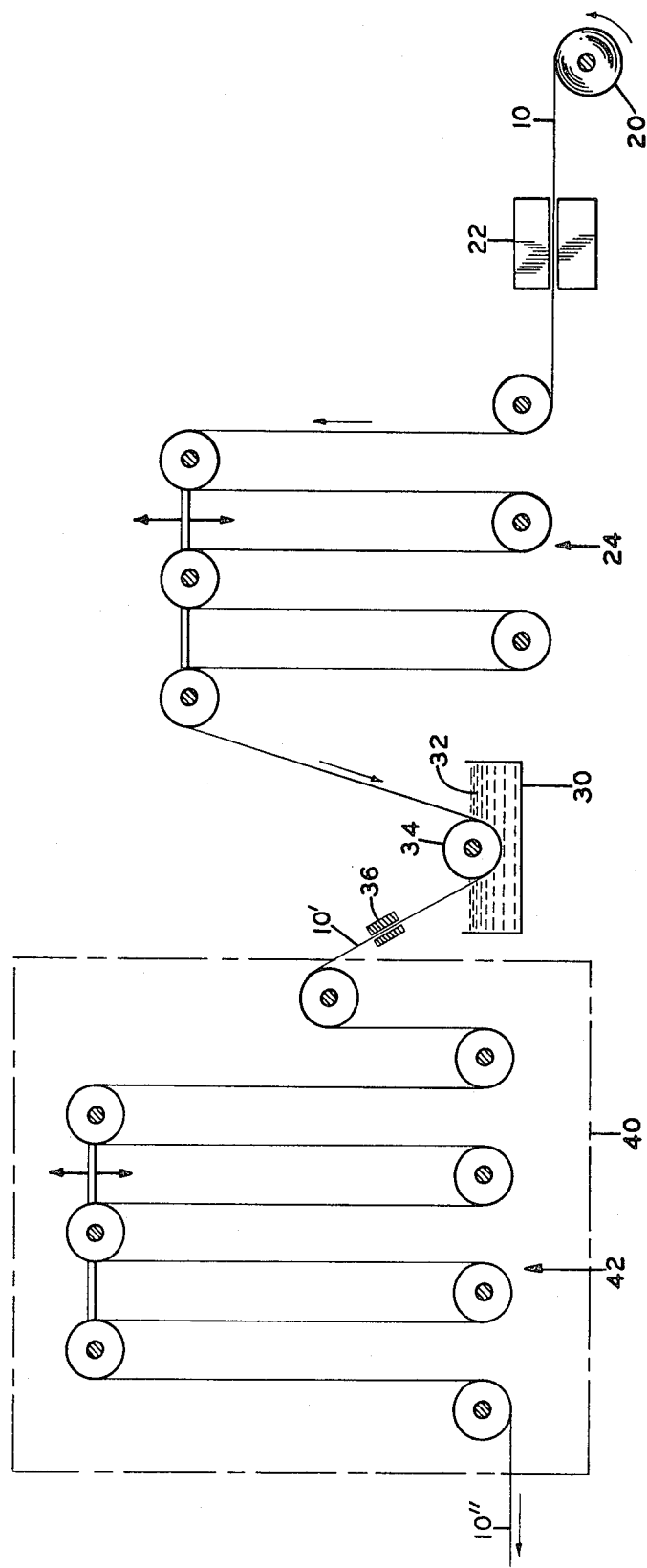

METHOD FOR PRETREATING GLASS CORDS WHICH MINIMIZES CORD BLOWS

This is a continuation of application Ser. No. 795,258 filed May 9, 1977 which is a continuation of Ser. No. 366,902, filed June 4, 1973 both now abandoned.

BACKGROUND OF THE DISCLOSURE

1. Field of the Invention

This invention relates to elastomeric products reinforced with glass fabric or cords, and more particularly, to a method for treating the glass cords to eliminate the occurrence of cord blows in the glass reinforced elastomer.

The term "glass fibers", as used herein, refers to fibers formed, for example, by the rapid attenuation of hundreds of streams of molten glass, and to strands formed when such glass fiber filaments are gathered together. Generally, the term "glass cords" refers to the product formed by plying and/or twisting a number of glass strands together. Many elastomeric articles, especially those made from rubber, such as pneumatic tires, conveyor belts, power transmission belts, and the like are reinforced with glass cords or fabric which serve to increase the tensile strength of the article and minimize distortion under service conditions.

While the present invention can be used advantageously with any glass cord-reinforced elastomeric article, it is especially adapted for use in making pneumatic tires and will be described in connection therewith. Glass cords are most frequently used in the breaker skim of pneumatic tires, although glass cords can also be used in the carcass plies. The breaker is made by calendering the glass cords with the rubber compound.

Glass cords for use in tires are normally treated before calendering with an adhesive system containing resorcinol-formaldehyde resin and rubber latex (such as vinyl pyridine). Although the conventional dipped-glass fabric has performed satisfactorily in tires, it has been found that the durability of the cord is improved by an increase in the amount of dip on the cord, yielding what is referred to as a "high dip pickup" (DPU) glass fabric. Whereas the conventional glass fabric comprises about 15% to about 18% by weight of the dip, the high DPU glass fabric comprises about 30% by weight of the dip. The high DPU glass fabric has greater resistance to fracturing and powdering of the individual fibers during the normal flexing of the cord. Adhesion, and tensile strength are similarly improved.

It was found however, that tires using the high DPU glass fabric, as opposed to the conventional glass fabric, showed an increase tendency toward cord blows (loss of bundle integrity), which can be identified by a void between the cord and the rubber, and extending along the cord. The cord blows are most frequently found at the breaker edge, in the thicker shoulder portion of the tire where it takes longest to cure the rubber compound. The result may be a high speed failure and tread loss after a period of operation, as the air in the void around the cord heats, expands and propagates the blow circumferentially around the tire.

It is believed that this tendency for the cord to blow is related to the use of the high DPU glass fabric, in that it contains more unsaturated polymer which must be cured. This additional amount of polymer in the dip takes sulfur from the adjacent rubber compound, i.e., the curatives migrate from the curative-rich ply skim to the curative-deficient glass dip. The result is that the glass dip and the majority of the rubber compound are cured, but the compound immediately adjacent each cord is not fully cured or "compacted", so that when the curing mold pressure is released at the end of the cure cycle, gas trapped within the cord can expand, forcing the adjacent rubber compound out away from the cord and creating the void or "cord blow". While this is believed to be the mechanism by which a cord blow occurs, it should be clearly understood that the operation of the present invention is in no way dependent upon this particular mechanism or any of its specific steps.

2. Description of the Prior Art

One proposed solution to the problem of cord blows was the addition of more cure accelerator to the rubber compound. Although this additional accelerator enabled the rubber compound immediately adjacent each glass cord to cure within the normal curing cycle, it was found that the remainder of the skim compound cured prematurely, scorching the compound during calendering or other process operations.

The problem of cord blows with the high DPU glass fabric was temporarily overcome, sufficiently to enable continued use of the high DPU fabric, by increasing the curing cycle for the tire, for example, from about 14 minutes to about 15 minutes. The result was a decrease of about 7% in curing capacity, i.e., the number of tires having high DPU glass fabric which could be cured.

SUMMARY OF THE INVENTION

Accordingly, it is an object of the present invention to provide a method for treating high dip pickup glass fabric which will economically overcome the problems discussed above.

More specifically, it is an object of the present invention to provide a method of treating high DPU glass fabric before calendering it to rubber which will reduce and/or compensate for the migration of curatives from the rubber compound adjacent the glass cord to the dip on the cord.

It is a related object of the present invention to provide a method for treating glass cords which will reduce the blow point, i.e., the curing time required to completely cure the rubber compound surrounding the cord.

These and other objects of the present invention are accomplished by the provision of an improvement in the method of preparing a glass-reinforced elastomeric product. The method includes treating the glass fabric with a dip which improves adhesion to the rubber, and calendering the glass fabric and the rubber compound. The improvement comprises the step, prior to calendering, of applying to the glass fabric an overdip composition including an effective amount of a material which is a cure accelerator for the rubber, whereby the amount of time required for full cure, and compaction of the rubber compound is reduced.

In accordance with another aspect of the present invention the cure accelerator is selected from the group consisting of thioureas, dithiocarbamates, thiurams, thiazoles, aldehyde-amine reaction products, amines, ureas, xanthates, peroxides, guanidines and sulfenamides.

DESCRIPTION OF THE PREFERRED EMBODIMENTS

The FIGURE, which is for the purpose of illustrating a preferred embodiment of the present invention and not for limiting the same, illustrates a typical way of practicing the present invention on glass cords or fabric which is to be calendered with rubber to form either ply stock or belt stock for pneumatic tires. The fabric or cord 10, coming from let-off roll 20, would normally be as received from the supplier, having already been dipped with an adhesive system, such as one containing resorcinolformaldehyde resin and rubber latex as discussed previously. The fabric 10 then passes through a splice unit 22 of the type well known in the art, and is then threaded around the rollers of the festoon 24, which permits a splice to be made without stopping the continuous flow of fabric to the subsequent operations. The fabric 10 may then be treated in accordance with this invention by passing it through the dip tank 30 containing the overdip solution 32, which thoroughly coats the fabric as it passes around roller 34.

The overdipped fabric 10' passes through a wiper 36 which removes the excess overdip solution. Subsequently, the overdipped fabric 10' enters an oven 40 in which the liquid in the overdip solution, such as water or a solvent is evaporated, leaving a dry coating of the overdip solids on the individual cords. The amount of time spent in the oven 40 by the fabric is typically controlled by means of a rollevator 42, on which the top set of rollers can be adjusted vertically in much the same fashion as on the festoon 24. The dry, overdipped fabric 10'' is shown leaving the oven 40, preparatory to being calendered to the rubber compound.

It should be clearly understood that the use of a liquid overdipping process as illustrated herein is only one possible method of applying the rubber accelerator within the scope of the present invention. Alternatively, the accelerator in dry powder form may be dusted on prior to the calendering, or may even be applied in the form of a wax or by means of electrodeposition or impregnating the individual cords, prior to weaving the fabric, in a manner similar to knifecoating.

If an overdip process as illustrated in the FIGURE is to be used, the overdip solution may comprise, alternatively, a liquid accelerator, a super saturated solution or an unsaturated solution of the accelerator in a solvent such as water, or a dispersion (either an emulsion or a suspension). For most of the cure accelerators in the examples given later, the liquid phase of the solution or dispersion was water which is preferable because of the ease of drying and elimination of any problem of volatility.

It was found while evaluating the various accelerators discussed in the examples that the proportion of accelerator in the overdip solution, and hence the amount applied to the cord, is not at all critical. There appeared to be very little difference in the blow point reduction time between the use of a 50% dispersion, which might yield an overdip coating of anywhere from about 5% to about 15% by weight, as opposed to a 5% or 10% dispersion, in which case the amount of overdip adhering to the cord was almost negligible. Therefore, in practicing the present invention, for reasons of economy it is desirable to experimentally determine the minimum percentage of accelerator in the dispersion or solution which preforms satisfactorily.

Each of the following examples incorporates a "blow point series", comparing qualitatively the extent of blow in the control sample (untreated, no overdip) with that in the sample dipped with the particular rubber accelerator. After the data is the "reduction", i.e., the difference between the earliest cure times for the sample and the control for which no blow was observed. The high dip pick-up glass cord used for this test (either untreated or overdipped) was first calendered and from this ply skim, small pieces were cut and bias-plied with opposite bias angles to form the samples which were subsequently cured. For maximum benefit, the samples should be assembled and cured in such a way that there is sufficient air available to the cords to accurately simulate the blow point which would occur in a tire, i.e., the time of cure vs. the extent of blow. If there is not as much air available to the cords in the sample as there would be in a tire, the blow point may be deceptively low, i.e., blowing may be eliminated in the sample after only a very short cure time whereas serious blowing would occur in a tire after the same cure time. It should be understood that the times are not precise because the cure times were increased from sample to sample within a series by half-minute increments, but it is believed that the test gives a good approximation of the actual blow-point reduction.

EXAMPLE 1

The treated cords were overdipped with a supersaturated solution of water and 2-mercaptoimidazoline, a thiourea sold under the trademark "NA-22" by du Pont.

| Cure time (min.) | Extent of Blow | |
|---|---|---|
| | Control | Treated |
| 6.0 | Complete | Slight |
| 6.5 | Slight | Slight |
| 7.0 | Slight | None |
| 7.5 | Slight | None |
| 8.0 | None | None |

Reduction - 1.0 min.

EXAMPLE 2

The treated cords were overdipped with a liquid dithiocarbamate sold under the trademark "Setsit 51" by R. T. Vanderbilt Co.

| Cure Time | Control | Treated |
|---|---|---|
| 6.0 | Complete | Slight |
| 6.5 | Complete | None |
| 7.0 | Slight | None |
| 7.5 | None | None |
| 8.0 | None | None |

Reduction - 1.0 min.

EXAMPLE 3

The treated cords were overdipped with a supersaturated solution of water and tetramethylthiuram monosulfide, a thiuram sold under the trademark "TMTM" by Aceto.

| Cure Time | Control | Treated |
|---|---|---|
| 6.0 | Complete | Complete |
| 6.5 | Complete | Slight |
| 7.0 | Slight | None |

-continued

| Cure Time | Control | Treated |
|---|---|---|
| 7.5 | None | None |
| 8.0 | None | None |

Reduction - .5 min.

EXAMPLE 4

The treated cords were overdipped with an aqueous dispersion of Zn-2-mercaptobenzothiazole, a thiazole sold under the trademark "Zetax" by Vanderbilt.

| Cure Time | Control | Treated |
|---|---|---|
| 6.0 | Complete | Slight |
| 6.5 | Complete | None |
| 7.0 | Slight | None |
| 7.5 | Slight | None |
| 8.0 | None | None |

Reduction - 1.5 min.

EXAMPLE 5

The treated cords were overdipped with a liquid aldehyde-amine reaction product sold under the trademark "Trimene Base" by Uniroyal.

| Cure Time | Control | Treated |
|---|---|---|
| 5.0 | Complete | Slight |
| 5.5 | Complete | Slight |
| 6.0 | Complete | Slight |
| 6.5 | Slight | None |
| 7.0 | None | None |

Reduction - .5 min.

EXAMPLE 6

The treated cords were overdipped with an aqueous solution of a powdered amine sold under the trademark "Hexamethylene Tetramine" by du Pont.

| Cure Time | Control | Treated |
|---|---|---|
| 5.0 | Complete | Complete |
| 5.5 | Complete | Complete |
| 6.0 | Complete | Slight |
| 6.5 | Slight | None |
| 7.0 | None | None |

Reduction - .5 min.

EXAMPLE 7

The treated cords were overdipped with an aqueous dispersion of a powdered urea, diamino methanone, sold under the trademark "B-I-K" by Uniroyal.

| Cure Time | Control | Treated |
|---|---|---|
| 5.0 | Complete | Complete |
| 5.5 | Complete | Complete |
| 6.0 | Complete | Slight |
| 6.5 | Slight | None |
| 7.0 | None | None |

Reduction - .5 min.

EXAMPLE 8

The treated cords were overdipped with a liquid xanthate, dibutylxanthogen disulfide, sold under the trademark "C-P-B" by Uniroyal.

| Cure Time | Control | Treated |
|---|---|---|
| 5.0 | Complete | Complete |
| 5.5 | Complete | Complete |
| 6.0 | Complete | Slight |
| 6.5 | Complete | None |
| 7.0 | None | None |

Reduction - 1.0 min.

EXAMPLE 9

The treated cords were overdipped with a liquid peroxide, 2,5 bis (t butylperoxy)-2,5-dimethylhexane, sold under the trademark "Varox" by Vanderbilt.

| Cure Time | Control | Treated |
|---|---|---|
| 5.0 | Complete | Complete |
| 5.5 | Complete | Complete |
| 6.0 | Complete | Slight |
| 6.5 | Slight | None |
| 7.0 | Slight | None |

Reduction - 1.0 min.

In addition to these examples, several samples were overdipped with a solution of a mixture of two powdered accelerators. The powders were a guanidine sold under the tradename "DOTG" du Pont and sulfenamide sold under the trademark "Santocure", also Monsanto, this overdip also reduced the blow-point, as compared to the control, although no specific qualitative data is available.

From a review of the foregoing examples, it appears that the method of the present invention operates successfully regardless of which particular class of rubber accelerator is used, whether it is a sulfur donor, an acidic accelerator or an amine accelerator. Therefore, as used herein, the term "cure accelerator" is intended to mean and include any material which is a cure accelerator (or curing agent) for the particular rubber compound being used. The accelerator may be of either the catalytic or reactive type and may be of any of the classes commonly known in the curing art.

The method of the present invention has been disclosed in detail sufficient to enable one of ordinary skill in the art to practice the invention. Many alternative and modifications may occur to those skilled in the art, and it is intended that the present invention include all such alternatives and modifications insofar as they come within the scope of the appended claims.

What is claimed is:

1. In a method of making a glass-cord-reinforced rubber tire free of cord blows which includes the steps of treating the glass cords with a dip which improves its adhesion to the rubber and constitutes from about 18% to about 30% by weight of the treated glass cords on a dry basis, calendering the glass cords with a rubber compound, then incorporating the calendered glass cords into an uncured rubber tire, then curing the tire, the improvement consisting essentially of the step, prior to the calendering of:

applying to the impregnated glass cords an effective amount to reduce cord blows of a cure accelerator for the rubber.

* * * * *